United States Patent [19]

Barber

[11] 4,207,130

[45] Jun. 10, 1980

[54] LINING OF PASSAGEWAYS

[75] Inventor: Bernard Barber, Hastings, England

[73] Assignee: Trio Engineering Limited, Georgetown, Cayman Islands

[21] Appl. No.: 928,276

[22] Filed: Jul. 26, 1978

[30] Foreign Application Priority Data

Jul. 27, 1977 [GB] United Kingdom ............. 31628/77

[51] Int. Cl.² .................. B29C 17/07; B29D 23/04
[52] U.S. Cl. ................................ 156/244.13; 29/235; 29/423; 29/451; 156/244.24; 156/294; 264/177 R; 264/209; 264/210.1; 264/261; 264/267; 264/146; 264/36; 264/173; 264/285; 264/295; 264/249
[58] Field of Search ............. 264/249, 259, 267, 294, 264/295, 209, 210, 173, 285, 280, 270, 320, 339, 177 R, 261, 146, 36; 156/198, 244.13, 244.15, 244.24, 200, 203, 215, 218; 425/289, 505; 29/235, 423, 451, 33 D, 33 K, 33 T

[56] References Cited

U.S. PATENT DOCUMENTS

| | | | |
|---|---|---|---|
| 1,385,220 | 7/1921 | Marquette | 29/451 |
| 3,020,192 | 2/1962 | Stephens et al. | 29/235 |
| 3,069,744 | 12/1962 | Emery | 29/423 |
| 3,084,086 | 4/1963 | Roberts et al. | 264/275 |
| 3,894,328 | 7/1975 | Jansson | 29/451 |

*Primary Examiner*—W. E. Hoag
*Attorney, Agent, or Firm*—Fred Philpitt

[57] ABSTRACT

The invention permits the lining of a passageway or pipeline with a resilient but robust, semi-rigid plastics pipe. The invention enables the lining of pipelines and passageways of long length by extruding the lining tube on site, deflecting the tube so that it is deflected into smaller diametral size, holding the tube in the deflected condition, feeding the deflected and held tube into the passageway to be lined, and releasing the hold on the tube so that it deflects or is deflected back to its original form and lines the pipeline or passageway.

16 Claims, 5 Drawing Figures

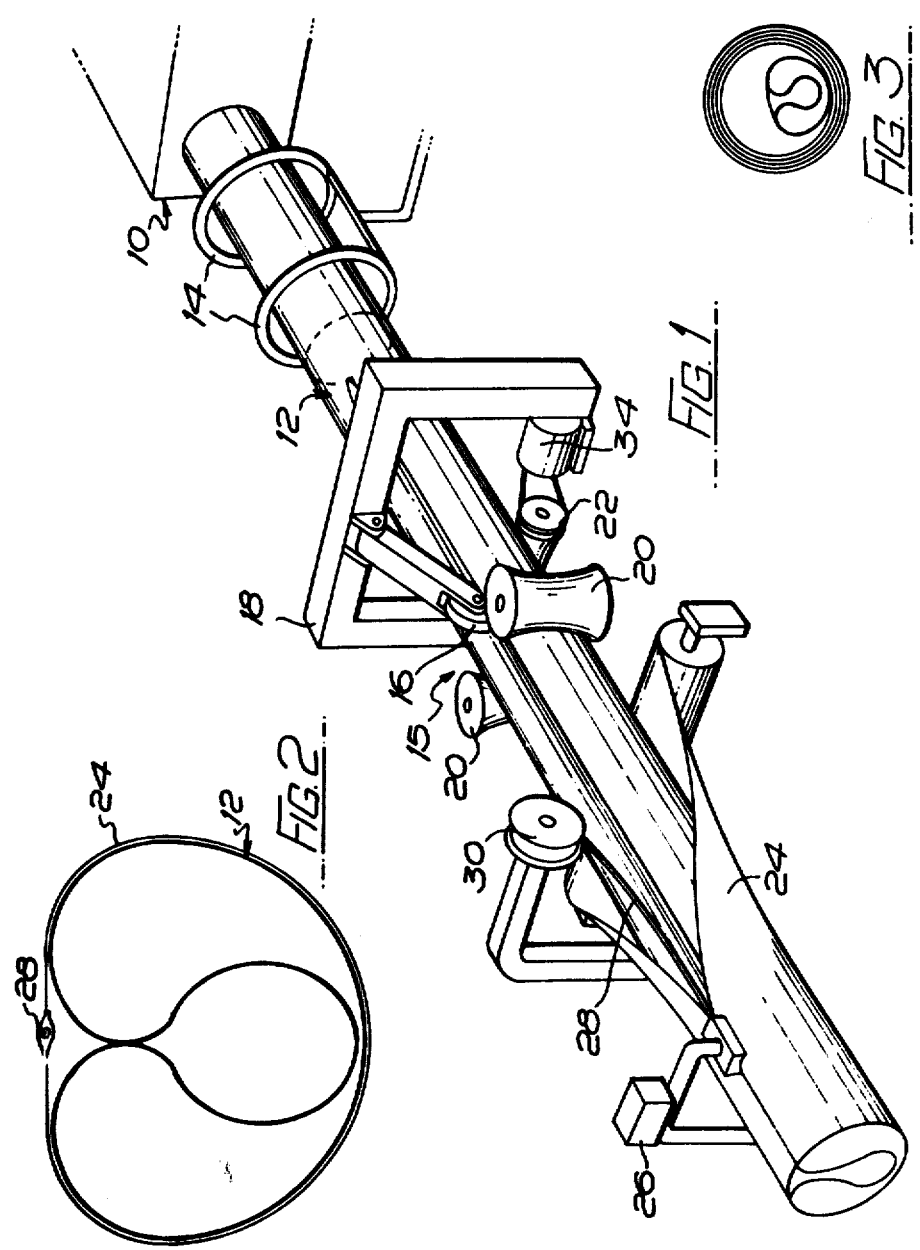

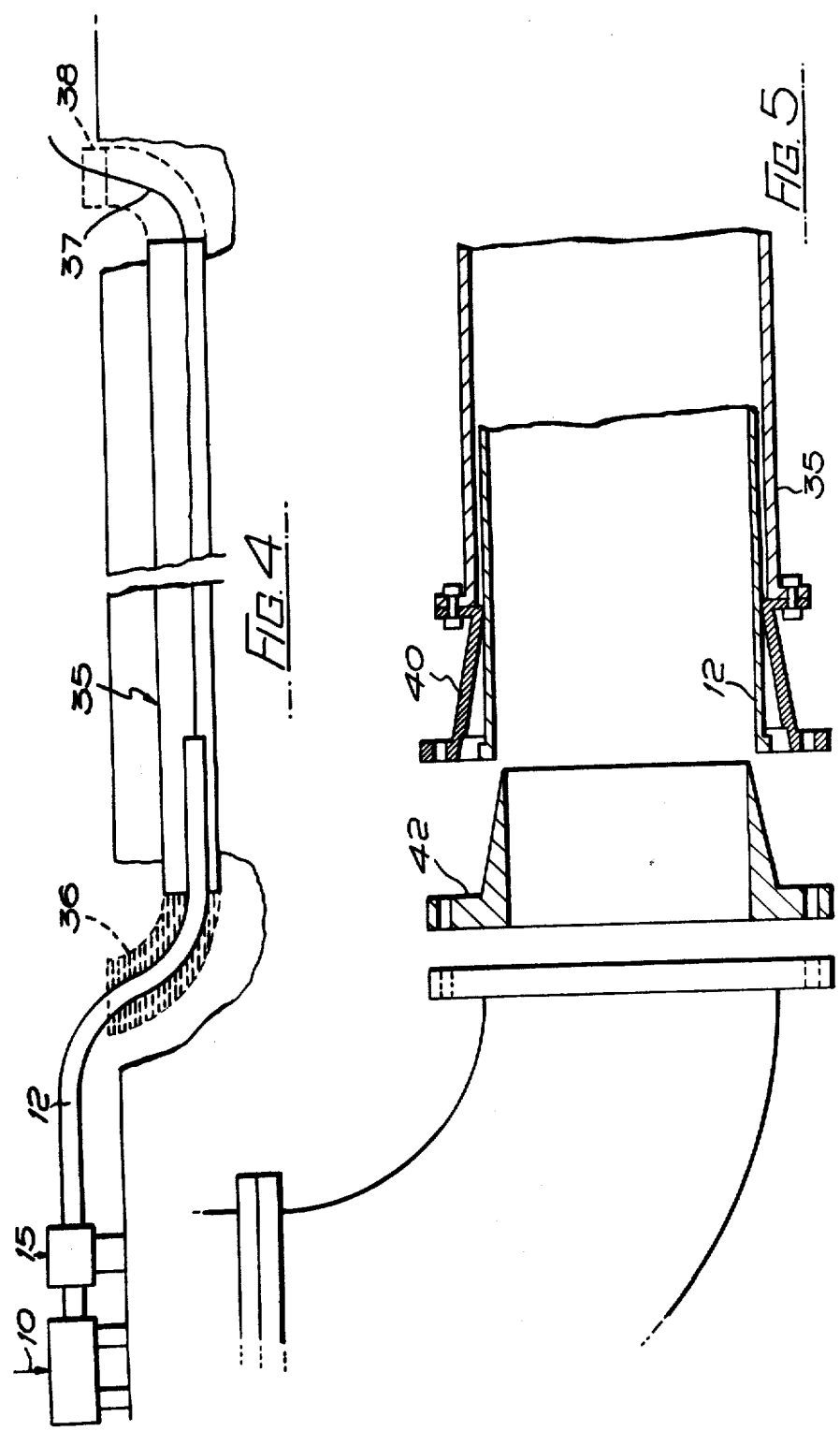

LINING OF PASSAGEWAYS

This invention relates to the lining of passageways, especially long underground passageways, such as sewers and pipelines.

There have been many proposals for the lining of passageways because throughout the world there is a very large number of passageways in need of repair and/or restoration. Passageways may need repair because of a number of reasons. For example an underground sewer may be leaking to such an extent that sewage is leaking into the surrounding subsoil or a pipeline may be leaking to such an extent that ground water and other liquid deposits are leaking through the pipeline into the interior of the pipeline, which may be carrying a medium which is becoming contaminated by the ingressing liquid. Again, the passageways may require repairs where they are not actually leaking, but are corroding or eroding, which could leak to leakage. Still further, it may be required to line a passageway in order to change its function e.g. it may be desired to line an otherwise corrosive passageway with an anti corrosive liner, to enable that passageway to carry corrosive material, or it may be desirable to insert a liner in order to enable the passageway to carry medium under pressure, the liner providing a means of supporting or assisting in supporting the pressure forces of the pressure medium.

It will be appreciated that depending upon requirements, liners for pipelines vary from thin, flimsy forms of plastics foil where a surface is simply to be protected from an environment, to heavy resin impregnated felts where the liner is to support the pressure of the medium flowing in the passageway and to protect the passageway surface from chemical attack and impacts from objects and debris being carried by the medium.

In all of the known systems for passageway lining there is a common problem of inserting long length linings (over 1,000 feet) into a pipeline without having to provide the linings in sections and having to provide many joints which can be a source of leakage. The problem of providing sealed jointing with the heavier gauge liners has not fully been solved for cases where the passageway carried a fluid, such as gas, under pressure.

It is possible to insert long lengths of flimsy material into passageways by everting it thereinto, but such liners cannot be used to increase the pressure containing capability of the passageway.

Heavy, resin impregnated felt liners must of necessity be of finite length as otherwise they become impossible to handle.

There is, therefore, a real need to provide a method of lining passageways with a liner which can be made in long lengths, and is robust enough to contain fluid under pressure.

The present invention deals with this need and in accordance with the invention there is provided a method of lining passageways comprising extruding a tubular liner of plastics at the site of the passageway to be lined, such liner being of such a resiliency that it can be flexed but will return or tend to return to the unflexed condition when released, deflecting the tubular extrudate to a condition in which the largest diametral dimension of the deflected tube is less than the outer diemeter of the undeflected tube, releasably holding the tube, whilst in deflected condition, inserting the held, deflected tube into the passageway to be lined, and releasing the hold on the tube when the tube is in the passageway and either allowing or causing the tube to return to its central undeflected condition.

The extruding, deflecting, holding and inserting the tube in the passageway preferably is effected in a continuous operation.

After the tube has been placed in the passageway and the holding means released, the interior of the tube may be pressurised in order fully to redeflect the tube to the circular form, or such operation may be effected by passing a pipeline pig through the tube.

The tube may be edflected to horse-shoe shape in cross section and the holding means may be a tape or sleeve of plastics foil. In the case of a tape it may be applied to the tube with adhesive and be such as to be releasable by peeling the tape from the tube. There a sleeve is used it may have a seam of weakening which can be ruptured, for example by igniting a fuse embodied therein along such seam.

After the tube is extruded and whilst still soft, it may be expanded up to the required size before being deflected.

If it is desired to provide a liner in the passageway which has a higher hoop stress than a single extrudate, the process of the invention can be repeated a number of times, each subsequent extrudate being inserted in the previous extrudate, until a liner of the desired thickness is formed.

An embodiment of the invention will now be described, by way of example, with reference to the accompanying diagrammatic drawings, wherein:

FIG. 1 is a perspective view of apparatus for carrying out the method of the invention;

FIG. 2 is a sectional view showing the tubular extrudate in the deflected condition;

FIG. 3 is a view similar to FIG. 2, showing how a number of extrudates may be placed one within another;

FIG. 4 shows how the method is carried out in lining a passageway in the form of an underground pipeline; and FIG. 5 is a sectional side view showing how the end of the tubular extrudate may be anchored when positioned in the passageway.

Referring to the drawings, and firstly to FIG. 1, reference 10 indicates a conventional extruder for producing a tubular plastics material extrudate 12. The extrudate is shown as passing through spray bars 14 from which cold water is sprayed onto the extrudate in order that the plastics material will set, and from the spray bars, the plastics material tube passes through a forming apparatus 15, comprising a deflecting roller 16 carried by a frame 18, and folding rollers 20. The deflecting roller 16 deflects the upper central portion of the tube which is semi-rigid so that it takes up a horse-shoe type configuration in cross section as shown in FIG. 2 and the rollers 20, which are waisted as shown press the sides of the horse-shoe cross section together. A driving roller 22 drives and supports the tube 12. Said roller 22 is driven by a motor 34.

As the thus deflected tube 12 proceeds from the deflecting apparatus 15, it is wrapped with a plastics foil or fabric 24 which may be of polyvinyl chloride and is wrapped around the tube 12 as shown so that the edges thereof overlap at a hot malt bonder unit 26, and such edges are sealed in order to form a sleeve around the deflected tube 12 to hold it in the deflected condition. Along the seam there is inserted a fuse wire 28 which is supplied from a fuse supply reel 30. The purpose of the fuse wire will become clear hereinafter.

Referring now to FIG. 4, the thus deflected tube 12, held in deflected condition by the foil 24 is fed directly into a passageway 35 to be lined with the material of tube 12. Insertion into the passageway 35 is facilitated by virtue of the fact that the tube 12 is held in deflected condition and in this condition the largest diametral dimension of the tube 12 is less than the outer diameter of the tube prior to deflection and is smaller than the inner diameter of the passageway to be lined. In FIG. 4 the free end of the tube 12 is shown as being connected to a pulling member 37 in the form of a rope, and additionally the tube 12 is shown as being led through a lead-in pipe 36 and out of a tail pipe 38. The pipes 36 and 38 are connected to the ends of the underground pipeline 30 in a watertight manner, and in fact the passageway 30 and the pipes 36 and 38 are flooded with water in order to facilitate travel of the tube 12 through the passageway 30. When the tube 12 is in position, the water can be removed from the passageway, but it may be desireable to introduce a lubrucant into the water, such as a soap composition in order that the tube 12 which in itself is reasonably bendable, can easily follow beds in the passageway 35. This applied especially in the case where the passageway is prelined with a thin film of plastics material such as polythene film. The free end of the tube 12 will of course be sealed in order that the interior of the pipe does not become flooded with water, although in some instances it may be acceptable to allow this to happen. It is desireable that the pipe 12, which may have to travel long lengths, e.g. over 1,000 ft. should have a near neutral buoyancy in any liquid contained in the passageway 37, as otherwise there could be substantial drag forces exerted on the lines as it is inserted into the pipeline.

The process up to the stage of placement of the lining tube 12 in the pipeline 35, is continuous, which provides for minimum operation time, but if the extruder can be stopped and started satisfactorily, the process can be operated on a step by step basis.

When the tube 12 is in position, the holding effect of the sleeve 24 is released, and in this example this is achieved by igniting the fuse 28 which ruptures the sleeve 24, and allows the deflected tube 12 once more to expand to the circular condition and into a position lining the interior of the passageway 30. The return of the tube 12 to circular form may be assisted by pressurising the interior of the tube 12 with fluid under pressure as by passing a pipeline pig therethrough from end to end.

In relation to the passageway or pipeline to be lined, the lining tube 12 may be of slightly larger diameter or smaller diameter than that of the passageway or pipeline. When the tube 12 is of slightly larger diameter, when it returns to its circular form in the passageway or pipe line it snaps into position and in so doing becomes circumferentially compressed in that it is prevented from taking up its natural size. When the lining tube 12 is sized to snap into a circumferentially stressed condition as described, it is preferably only slightly larger diameter than the pipeline or passageway to ensure that the tube 12 does snap into circular form. This arrangement is useful when the lining operation is to provide for example a liquid impermeable barrier rather than stress taking member.

When the tube 12 is sized to be of smaller diameter than the pipeline or passageway surface to be lined, it may be only slightly smaller or significantly smaller. One may arrange for the lining diameter to be slightly smaller than the passageway or pipeline surface where the lining tube has to carry fluid under pressure and must expand under the said pressure, and thereby contribute to taking a certain amount or all of the hoop stress in order to contain the fluid.

When the tube 12 is of significantly less diameter than the pipeline or passageway the fold in the tube 12 as formed by rollers 16, 20 may be filled with a filling material such as mastic which spreads round the tube to fill the clearance between the tube 12 and pipeline or passageway surface, when the hold on the deflected tube 12 is released.

In the case where the liner has to be sufficiently strong to contain pressure forces when fluid medium under pressure passes through the passageway, the process as described in relation to FIG. 4, can be repeated, each subsequent extrudate being placed inside the previous extrudate in the manner described, and so that there is a small peripheral clearance between each lining tube and the inner surface of the tube in which it is located. FIG. 3 shows how a number of extrudates have been positioned one within the other, and also shows a final extrudate whilst still held in the deflected condition, inside the previous extrudate and ready to be expanded back to its original circular form. By this repetition of the process, a liner of any desired thickness and hoop strength within limits can be built up.

It would not be possible to insert a single liner of the same overall thickness as a number of extrudates, because it would be extremely difficult to deflect such a one-piece liner to make it smaller in overall dimensions than the passageway, and it would not bend longitudinally to pass through the pipes 36 and 38 and any other bends in the passageway 35.

The invention is particularly suitable for pipelines and passageways which are neither too small not too large. For very large passageways, i.e. ones in which human beings can freely walk or move, other lining techniques can be used, because there is not the same difficulty in the creation of joints between sections of liner, and for very small pipelines, it becomes extremely difficult to deflect the tubular member 12 down to a smaller size for insertion in the pipeline and the frictional forces created by endeavouring to direct a deflected tube around bends and curves become prohibitive. The invention can however be used over a wide range of passageway sizes for example from pipelines of the order of 4 or 5 inches diameter up to passageways of the order of 4 to 5 feet.

The final size of the tube 12 as it is extruded from the extruder 10 is established before the material is set and there may be a means for causing the extrudate to inflate up to the desired size whilst it is still soft. It will be necessary of course to reduce the size of subsequent extrudates when a multilayer lining tube is being built up, such as in the arrangement shown in FIG. 3.

The tubular extrudate may be formed of any suitable material such as polypropylene, high density polyethene or similar plastics material which has a significant plastic memory, and preferably is of a thickness to give the required flexing and recovery characteristics. Polypropylene of a thickness of ⅛" appears to give satisfactory characteristics in this respect.

One method of releasing the hold on the extrudate when in deflected condition in the passageway has been described, i.e. the use of a fuse, but other methods may be adopted. For example the holding means may be severed by a cutting means, or it may be in the form of a tape which is adhesively applied to the tube 12, but can be peeled therefrom, or it may be provided with a line of weakening which is fractured as a result of pressurisation of the interior of the tube 12 after it has been placed in position. In a further arrangement the holding effect is achieved by wrapping a web around the deflected tube in much the same manner as indicated in FIG. 1, but the adjacent edges of the web are held together by a running stitch arrangement sewn into the edges as they are brought together the entire seam being releasable by following on the thread at one end of the assembly comprising inner tube and outer web. Pulling on such thread causes the stitching to release along the entire length of the seam. An alternative holding arrangement comprises a mandrel of appropriate shape and having ducting whereby, when the tube is over the mandrel, and a source of negative pressure is applied to the ducting, the tube is sucked onto the mandrel, and in being so sucked, the sectional shape changes such that the largest diametral dimension is less than that of the tube before deflection. The tube is so held until it is placed in the passageway when the source of negative pressure is released and air under pressure is supplied to the ducting inflating the tube to its original form. In any event, after the hold of the holding means has been released, the tube 12 will tend to return to its initial undeflected condition, but to ensure that it does it may be desireable to pressurise the interior of the tube 12 or to pass a pipeline pig therethrough. If the tube 12 is of slightly larger diameter than the internal diameter of the passageway 35, it will finally be placed in position by a snapping action which results in the liner tube being placed in compression, as described herein. Where a multi-layered liner is built up, it can be arranged that each subsequent extrudate is snapped into the previous extrudate in the manner described above.

Referring finally to FIG. 5, in this drawing there is shown an arrangement illustrating how the end of the liner may be anchored by the use of complimentary wedgeing collars. An outer frusto-conical collar 40 is bolted to the end of the pipeline 35 and the free end of the liner 12 overhangs the bolt joint by an amount equal to the length of the collar 40. A male collar 42 having a frusto-conical outer surface is inserted into the free end of the liner 12 such that bolt holes in flanges of collars 40 and 42 become aligned and bolts are passed therethrough and tightened with the effect that the free end of the lining tube 12 becomes trapped and wedged between the frusto-conical faces of the two collars 40 and 42. Other arrangements for fixing the ends of the lining tube can of course be used.

The invention also provides a passageway lined in accordance with the method.

I claim:

1. A method of lining a passageway comprising extruding a tubular liner of plastics at the site of the passageway to be lined, such liner being of such a resiliency that it can be flexed but will return or tend to return to the unflexed condition when released, deflecting the tubular extrudate while the extrusion continues to a condition in which the largest diameteral dimension of the deflected tube is less than the outer diameter of the undeflected tube, releasably holding the tube whilst in deflected condition, inserting the held, deflected tube into the passageway to be lined, while the extrusion continues, and releasing the hold on the tube when the tube is in the passageway and either allowing or causing the tube to return to its initial undeflected condition.

2. The method according to claim 1, wherein the tube is held in deflected condition by adhesive tape extending lengthwise of the tube, and the hold on the tube is removed by removal of the said tape.

3. The method according to claim 1 wherein the tube is held in deflected condition by a shaped mandrel having ducts therein and over which mandrel the tube is placed and deflection is achieved by applying a vacuum to said ducts to draw the tube onto the mandrel surface.

4. The method according to claim 1, when repeated to insert a first tube in the pipeline or passageway and to insert subsequent tubes of progressively smaller dimension within the first tube, the second tube, the third tube and so on, until a laminated lining tube of required thickness is achieved.

5. The method according claim 4 wherein each tube is of polypropylene or high density polythene or similar plastics material which has a significant plastic memory and is of a thickness of the order of an ⅛".

6. The method according to claim 1 wherein the tube is held in deflected condition by a sleeve formed by wrapping a web around the deflected tube and by joining the meeting edges of the web to form a seam extending longitudinally of the tube.

7. The method according to claim 6 wherein the said seam is provided with a fuse wire, the ignition of which effects the splitting of the seam and the release of the hold on the deflected tube.

8. The method according to claim 6 wherein the sleeve has a line of weakening extending for the length thereof, and release of the hold on the tube is effected by pressurising the interior of the tube which bursts the sleeve along the line of weakening.

9. The method according to claim 1 wherein the deflecting is performed by passing the extrudate past forming rollers, which deflect the tube into horse-shoe shaped section.

10. The method according to claim 9, wherein the tube is of slightly larger diameter than the pipeline or passageway to be lined, so that it snaps into position lining the pipeline or passageway when it returns or is returned to its initial condition.

11. The method according to claim 9, wherein the tube is slightly smaller in diameter than the passageway or pipeline surface to be lined.

12. The method according to claim 11 wherein the deflected portion of the tube is filled with a grouting material such as mastic which fills the clearance between the outside of the tube and the pipeline or passageway surface when the tube returns or is returned to its initial condition.

13. A method of lining a passageway comprising inserting in the passageway a tubular liner of plastics of such resiliency that the tubular liner can be flexed but will return or tend to return to the unflexed condition when released, deflecting the tubular liner to a condition in which the largest diametral dimension of the deflected tube is less than the outer diameter of the undeflected tube, releasably holding the tube while in deflected condition, inserting the held, deflected tube into the passageway to be lined, buoyantly supporting the deflected and held tube as it is fed into the passageway using liquid in the passageway, and releasing the hold on the tubular liner when the tubular liner is in the passageway and either causing or allowing the tubular liner to return to its initial undeflected condition.

14. A method according to claim 13 wherein the liquid contains soap to act as a lubricant.

15. A method of lining a passageway comprising inserting in the passageway a tubular liner of plastics material of such resiliency that the tubular liner can be flexed but will return or tend to return to the unflexed condition when released, deflecting the tubular liner to a condition in which the largest diametral dimension of the deflected tubular liner is less than the outer diameter of the undeflected tubular liner, releasably holding the tubular liner while in deflected condition by a means containing a fuse wire which extends longitudinally of the liner and the setting off of which effects release of said holding of the tubular liner, inserting the held, deflected tubular liner into the passageway to be lined, setting off the fuse wire to release the hold on the tubular liner and either causing or allowing the tubular liner to return to its initial undeflected condition.

16. The method according to claim 15, wherein the tubular liner is held in deflected condition by a sleeve formed by wrapping a web around the deflected tubular liner and by joining the meeting edges of the web to form a seam extending longitudinally of the tubular liner, the fuse wire being inserted in said seam.

* * * * *